United States Patent
Sivan et al.

(10) Patent No.: US 12,332,682 B2
(45) Date of Patent: Jun. 17, 2025

(54) SYSTEM AND METHOD FOR CLOCK SYNCHRONIZATION AND TIME TRANSFER BETWEEN QUANTUM ORCHESTRATION PLATFORM ELEMENTS

(71) Applicant: Quantum Machines, Tel Aviv (IL)

(72) Inventors: Itamar Sivan, Tel Aviv (IL); Yonatan Cohen, Tel Aviv (IL); Nissim Ofek, Tel Aviv (IL); Asaf Rozen, Tel Aviv (IL); Guy Osi, Tel Aviv (IL); Ramon Szmuk, Bordeaux (FR)

(73) Assignee: Q.M Technologies Ltd. (IL)

( * ) Notice: Subject to any disclaimer, the term of this patent is extended or adjusted under 35 U.S.C. 154(b) by 926 days.

(21) Appl. No.: 17/381,270

(22) Filed: Jul. 21, 2021

(65) Prior Publication Data
US 2023/0153678 A1    May 18, 2023

(51) Int. Cl.
*G06F 1/12* (2006.01)
(52) U.S. Cl.
CPC ...................................... *G06F 1/12* (2013.01)
(58) Field of Classification Search
None
See application file for complete search history.

(56) References Cited

U.S. PATENT DOCUMENTS

| | | | |
|---|---|---|---|
| 4,875,484 A | 10/1989 | Anzai et al. | |
| 5,063,354 A | 11/1991 | Lauper et al. | |
| 5,194,907 A | 3/1993 | Hayashi | |
| 6,108,389 A * | 8/2000 | Morariu | H04L 1/06 |
| | | | 713/400 |
| 6,223,228 B1 | 4/2001 | Ryan et al. | |
| 6,426,984 B1 | 7/2002 | Perino et al. | |
| 6,993,108 B1 | 1/2006 | Chi et al. | |
| 7,451,292 B2 | 11/2008 | Routt | |
| 7,535,931 B1 | 5/2009 | Zampetti et al. | |
| 7,627,126 B1 | 12/2009 | Pikalo | |
| 8,315,969 B2 | 11/2012 | Roetteler | |
| 8,385,878 B2 | 2/2013 | Rao | |
| 8,750,717 B1 | 6/2014 | Yap et al. | |
| 9,207,672 B2 | 12/2015 | Williams | |
| 9,400,499 B2 | 7/2016 | Williams | |
| 9,509,324 B2 | 11/2016 | McDonald et al. | |
| 9,663,358 B1 | 5/2017 | Cory et al. | |

(Continued)

FOREIGN PATENT DOCUMENTS

| | | |
|---|---|---|
| CA | 2420022 | 2/2003 |
| CN | 1808103 A | 7/2006 |

(Continued)

OTHER PUBLICATIONS

Cross et al. "Open Quantum Assembly Language", Jan. 10, 2017.

(Continued)

*Primary Examiner* — Stefan Stoynov
(74) *Attorney, Agent, or Firm* — McAndrews, Held & Malloy, Ltd.

(57) ABSTRACT

A quantum orchestration platform (QOP) comprises a collection of processing units and analog components that produce synchronized analog pulses, readouts, and computations that may be used for operations with qubits. All processing units of the QOP are synchronized with minimal skew via time processing over one or more sync cables that interconnect the processing units.

14 Claims, 7 Drawing Sheets

(56) References Cited

U.S. PATENT DOCUMENTS

| | | |
|---|---|---|
| 9,692,423 B2 | 6/2017 | McDermott, III |
| 9,847,121 B2 | 12/2017 | Frank |
| 9,858,531 B1 | 1/2018 | Monroe |
| 9,892,365 B2 | 2/2018 | Rigetti |
| 9,978,020 B1 | 5/2018 | Gambetta |
| 9,979,400 B1 | 5/2018 | Sete |
| 9,996,801 B2 | 6/2018 | Shim |
| 10,063,228 B2 | 8/2018 | Deurloo et al. |
| 10,122,351 B1 | 11/2018 | Naaman |
| 10,127,499 B1 | 11/2018 | Rigetti |
| 10,192,168 B2 | 1/2019 | Rigetti |
| 10,223,643 B1 | 3/2019 | Bishop et al. |
| 10,333,503 B1 | 6/2019 | Cohen et al. |
| 10,454,459 B1 | 10/2019 | Cohen |
| 10,496,069 B2 | 12/2019 | Nazarathy et al. |
| 10,505,524 B1 | 12/2019 | Cohen |
| 10,560,076 B1 | 2/2020 | Cohen |
| 10,637,449 B1 | 4/2020 | Cohen et al. |
| 10,659,018 B1 | 5/2020 | Cohen |
| 10,666,238 B1 | 5/2020 | Cohen |
| 10,958,253 B1 | 3/2021 | Cohen et al. |
| 10,985,739 B2 | 4/2021 | Cohen et al. |
| 11,010,145 B1 | 5/2021 | Smith et al. |
| 11,463,075 B2 | 10/2022 | Cohen et al. |
| 11,616,497 B2 | 3/2023 | Cohen et al. |
| 11,616,498 B2 | 3/2023 | Cohen et al. |
| 2002/0004876 A1 | 1/2002 | Timmer et al. |
| 2004/0266084 A1 | 12/2004 | Naaman et al. |
| 2005/0015422 A1 | 1/2005 | Kohn et al. |
| 2005/0180575 A1 | 8/2005 | Maeda et al. |
| 2006/0093376 A1 | 5/2006 | Mitchell et al. |
| 2008/0037693 A1 | 2/2008 | Andrus et al. |
| 2009/0268901 A1 | 10/2009 | Lodewyck et al. |
| 2010/0072979 A1 | 3/2010 | Fefer et al. |
| 2011/0035511 A1 | 2/2011 | Biederman |
| 2013/0198499 A1 | 8/2013 | Dice et al. |
| 2014/0143582 A1* | 5/2014 | Kindred ............ H04W 56/005 713/400 |
| 2016/0125311 A1 | 5/2016 | Fuechsle et al. |
| 2016/0267032 A1 | 9/2016 | Rigetti et al. |
| 2016/0292586 A1 | 10/2016 | Rigetti et al. |
| 2017/0094618 A1 | 3/2017 | Bjorkengren |
| 2017/0214410 A1 | 7/2017 | Hincks et al. |
| 2017/0364796 A1 | 12/2017 | Wiebe |
| 2018/0013426 A1 | 1/2018 | Deurloo et al. |
| 2018/0032893 A1 | 2/2018 | Epstein |
| 2018/0091244 A1 | 3/2018 | Abdo |
| 2018/0107579 A1 | 4/2018 | Chapman |
| 2018/0123597 A1 | 5/2018 | Sete |
| 2018/0237039 A1 | 8/2018 | Mong et al. |
| 2018/0260245 A1 | 9/2018 | Smith |
| 2018/0260730 A1 | 9/2018 | Reagor |
| 2018/0260732 A1 | 9/2018 | Bloom |
| 2018/0308007 A1 | 10/2018 | Amin |
| 2018/0322409 A1 | 11/2018 | Barends |
| 2018/0365585 A1 | 12/2018 | Smith |
| 2018/0373995 A1 | 12/2018 | Tomaru et al. |
| 2018/0375650 A1 | 12/2018 | Legre |
| 2019/0042964 A1 | 2/2019 | Elsherbini et al. |
| 2019/0042965 A1 | 2/2019 | Clarke |
| 2019/0042970 A1 | 2/2019 | Zou |
| 2019/0042971 A1 | 2/2019 | Fujishima et al. |
| 2019/0042972 A1 | 2/2019 | Zou |
| 2019/0042973 A1 | 2/2019 | Zou |
| 2019/0049495 A1 | 2/2019 | Fek |
| 2019/0251478 A1 | 8/2019 | Bishop et al. |
| 2019/0266512 A1 | 8/2019 | Shen et al. |
| 2019/0302832 A1 | 10/2019 | Morgan et al. |
| 2019/0317589 A1 | 10/2019 | Mathur et al. |
| 2020/0210248 A1* | 7/2020 | Dupont de Dinechin ................ G06F 15/17325 |
| 2020/0293080 A1 | 9/2020 | Poon et al. |
| 2020/0364602 A1 | 11/2020 | Niu et al. |
| 2021/0004707 A1 | 1/2021 | Gambetta et al. |
| 2021/0103847 A1 | 4/2021 | Akzam |
| 2021/0125096 A1 | 4/2021 | Puri et al. |
| 2021/0359670 A1 | 11/2021 | Cohen et al. |

FOREIGN PATENT DOCUMENTS

| | | |
|---|---|---|
| CN | 104467843 | 3/2015 |
| CN | 105281886 A | 1/2016 |
| CN | 105912070 A | 8/2016 |
| CN | 107408223 A | 11/2017 |
| CN | 108111306 A | 6/2018 |
| CN | 108594214 A | 9/2018 |
| CN | 108698815 A | 10/2018 |
| CN | 109165744 A | 1/2019 |
| CN | 110085094 A | 8/2019 |
| CN | 108780129 A | 11/2019 |
| CN | 110677210 | 1/2020 |
| CN | 111464154 | 7/2020 |
| CN | 111767055 A | 10/2020 |
| CN | 112019193 | 12/2020 |
| CN | 112149832 | 12/2020 |
| EP | 0388052 A2 | 9/1990 |
| JP | 09-321747 | 12/1997 |
| JP | 2000-49759 | 2/2000 |
| JP | 2007049009 A | 2/2007 |
| JP | 2009-68949 | 4/2009 |
| JP | 2011175078 | 9/2011 |
| JP | 2011-211412 | 10/2011 |
| JP | 2012188875 A | 10/2012 |
| JP | 2018137739 A | 8/2018 |
| WO | 2015178991 A2 | 11/2015 |
| WO | 2015178992 A2 | 11/2015 |
| WO | 2017078735 A1 | 5/2017 |
| WO | 2017123940 A | 7/2017 |
| WO | 2017139683 A1 | 8/2017 |
| WO | 2018055607 A1 | 3/2018 |
| WO | 2018062991 | 4/2018 |
| WO | 2019063117 A1 | 4/2019 |
| WO | 2020033807 A1 | 2/2020 |
| WO | 2020231795 | 11/2020 |
| WO | 2021123903 | 6/2021 |

OTHER PUBLICATIONS

Japanese Patent Office Action Appln No. 2021-529723 dated Oct. 26, 2022 with translation.
European Office Communication with extended Search Report Appln No. 20766036.6 dated Nov. 24, 2022.
Lavoie et al., "A Formalization for Specifying and Implementing Correct Pull-Stream Modules," in arXiv preprint arXiv:1801.06144 (2018). (Year: 2018).
Fu et al., "A Microarchitecture for a Superconducting Quantum Processor," in 38.3 IEEE Micro 40-47 (2018). (Year: 2018).
European Office Communication with extended Search Report Appln No. 20845965.1 dated Jun. 29, 2023.
European Office Communication with extended Search Report Appln No. 20861242.4 dated Jul. 7, 2023.
European Office Communication with extended Search Report Appln No. 23153085.8 dated Jul. 3, 2023.
Yang Yet al: "FPGA-based electronic system for the control and readout of superconducting qubit systems", arxiv.org, Cornell University Library, 201 Olin Library Cornell University Ithaca, NY 14853, Oct. 15, 2021 (Oct. 15, 2021), XP091078848.
Gebauer Richard et al: "A modular RFSoC-based approach to interface superconducting quantum bits", 2021 International Conference on Field-Programmable Technology (ICFPT), IEEE, Dec. 6, 2021 (Dec. 6, 2021), pp. 1-9, XP034028257, DOI: 10.1109/ICFPT52863.2021.9609909 [retrieved on Nov. 8, 2021].
European Office Communication with extended Search Report Appln No. 20861100.4 dated Jul. 21, 2023.
Fu et al. "eQASM: An Executable Quantum Instruction Set Architecture", 2019 IEEE International Symposium on High Performance Computer Architecture (HPCA), IEEE Feb. 16, 2019 (Feb. 16, 2019), pp. 224-237, XP033532496, DOI: 10.1109/HPCA.2019.

(56) References Cited

OTHER PUBLICATIONS

00040 Retrieved from the Internet: URL:https://ieeexplore.ieee.org/abstract/document/8675197/authors#authors [retrieved on Mar. 26, 2019].
Yunong Shi et al: "Optimized Compilation of Aggregated Instructions for Realistic Quantum Computers", arxiv.org, Cornell University Library, 201 Olin Library Cornell University Ithaca, NY 14853, Feb. 4, 2019 (Feb. 4, 2019), XP081025321, DOI: 10.1145/3297858.3304018.
Chinese Office Action Appln No. 2019800888907 with search report dated Jul. 28, 2023 with translation.
European Office Communication with extended Search Report Appln No. 20869503.1 dated Sep. 12, 2023.
Chinese Patent Office Action Appln No. 2019800902340 with search report dated Aug. 30, 2023 with translation.
Int'l Preliminary Report on Patentability Appln No. PCT/IB2022/050190 mailed Oct. 19, 2023.
Int'l Preliminary Report on Patentability Appln No. PCT/IB2022/000068 mailed Nov. 23, 2023.
Int'l Preliminary Report on Patentability Appln No. PCT/IB2022/000059 mailed Nov. 23, 2023.
Int'l Preliminary Report on Patentability Appln No. PCT/IB2022/000024 mailed Nov. 9, 2023.
Chinese Office Action Appln No. 2019800888907 dated Nov. 17, 2023.
European Office Communication with extended Search Report Appln No. 20902662.4.6 dated Dec. 21, 2023.
Int'l Preliminary Report on Patentability Appln No. PCT/IB2022/054903 mailed Dec. 28, 2023.
Int'l Preliminary Report on Patentability Appln No. PCT/IB2022/053304 mailed Feb. 1, 2024.
Int'l Preliminary Report on Patentability Appln No. PCT/IB2019/001394 mailed Jul. 29, 2021.
Int'l Preliminary Report on Patentability Appln No. PCT/IB2020/000218 mailed Sep. 16, 2021.
Int'l Preliminary Report on Patentability Appln No. PCT/IB2020/000376 mailed Nov. 12, 2021.
Int'l Search Report and Written Opinion Appln No. PCT/IB2021/056254 mailed Dec. 1, 2021.
Ribeiro, Diogo C., Pedro M. Cruz, and Nuno Borges Carvalho, "Towards a denser frequency grid in phase measurements using mixer-based receivers." 2015 85th Microwave Measurement Conference (ARFTG). IEEE, 2015. Dec. 31, 2015 (Dec. 31, 2015).
Int'l Preliminary Report on Patentability Appln No. PCT/IB2020/000555 mailed Feb. 10, 2022.
Int'l Preliminary Report on Patentability Appln No. PCT/IB2020/000707 mailed Mar. 17, 2022.
Int'l Preliminary Report on Patentability Appln No. PCT/IB2020/000704 mailed Mar. 17, 2022.
Int'l Preliminary Report on Patentability Appln No. PCT/IB2020/000760 mailed Apr. 7, 2022.
Int'l Search Report and Written Opinion Appln No. PCT/IB2022/050190 mailed Apr. 11, 2022.
Int'l Search Report and Written Opinion Appln No. PCT/IB2022/000059 mailed Jul. 7, 2022.
Moreira , "QuTech Central Controller: A Quantum Control Architecture for a Surface-17 Logical Qubit." Delft University of Technology Student Theses Collection (2019). Available at the following URL: http://resolver.tudelft.nl/uuid:502ed5e5-8717-42bd-a077-c24b7281cd94 May 10, 2019 (May 10, 2019).
Int'l Preliminary Report on Patentability Appln No. PCT/IB2020/001004 mailed Jun. 30, 2022.
Int'l Search Report and Written Opinion Appln No. PCT/IB2022/000024 mailed Jul. 18, 2022.
Baier, Simon, Matteo Pompili, Sophie LN Hermans, Hans KC Beukers, Peter C. Humphreys, Raymond N. Schouten, Raymond FL Vermeulen et al. "Realization of a Multi-Node Quantum Network of Remote Solid-State Qubits", Science, vol. 372, pp. 259-264 (2021) Baier Simon Apr. 16, 2021 (Apr. 16, 2021).
Int'l Search Report and Written Opinion Appln No. PCT/IB2022/000068 mailed Jul. 17, 2022.
D. Copsey et al., "Toward a scalable, silicon-based quantum computing architecture," in IEEE Journal of Selected Topics in Quantum Electronics, vol. 9, No. 6, pp. 1552-1569, Nov.-Dec. 2003, doi: 10.1109/JSTQE.2003.820922. Dec. 31, 2003 (Dec. 31, 2003).
Extended European Search Report Appln No. 19889443.8 dated Aug. 4, 2022.
Int'l Search Report and Written Opinion Appln No. PCT/IB2022/054903 mailed Sep. 8, 2022.
Int'l Preliminary Report on Patentability Appln No. PCT/IB2021/000067 mailed Sep. 22, 2022.
Int'l Search Report and Written Opinion Appln No. PCT/IB2022/053304 mailed Oct. 6, 2022.
Serrano, Javier, M. Lipinski, T. Wlostowski, E. Gousiou, Erik van der Bij, M. Cattin, and G. Daniluk. "The white rabbit project." (2013) Sep. 19, 2013 (Sep. 19, 2013) Entire document.
Extended European Search Report Appln No. 19910800.2 dated Oct. 6, 2022.
Hornibrook J M et al: "Cryogenic Control Architecture for Large-Scale Quantum Computing", arxiv.org, Cornell University Library, 201 Olin Library Cornell University Ithaca, NY 14853, Sep. 8, 2014 (Sep. 8, 2014), XP081391509.
Fu X et al: "An Experimental Microarchitecture for a Superconducting Quantum Processor", Micro-50 '17: Proceedings of the 50th Annual IEEE/ACM International Symposium on Microarchitecture, Cornell University Library, 201 Olin Library Cornell University Ithaca, NY 14853, Oct. 14, 2017 (Oct. 14, 2017), pp. 1-13, XP081291220.
Zopes J. et al: "High resolution quantum sensing with shaped control pulses", arxiv.org, Cornell University Library, 201 Olin Library Cornell University Ithaca, NY 14853, May 22, 2017 (May 22, 2017), XP081276850.
U.S. Appl. No. 62/294,966, filed Feb. 12, 2016.
Int'l Search Report and Written Opinion Appln No. PCT/IB2019/001410 mailed Jun. 10, 2020.
Int'l Search Report and Written Opinion Appln No. PCT/IB2019/001394 mailed Jun. 17, 2020.
Zhang J, Hegde SS, Suter D. Pulse sequences for controlled 2- and 3-qubit gates in a hybrid quantum register. arXiv preprint arXiv:1806.08408. Jun. 21, 2018.
Wang CY, Kuznetsova L, Gkortsas VM, Diehl L, Kaertner FX, Belkin MA, Belyanin A, Li X, Ham D, Schneider H, Grant P. Mode-locked pulses from mid-infrared quantum cascade lasers. Optics Express. Jul. 20, 2009;17(15):12929-43.
Int'l Search Report and Written Opinion Appln No. PCT/IB2020/000218 mailed Aug. 11, 2020.
Quan R, Zhai Y, Wang M, Hou F, Wang S, Xiang X, Liu T, Zhang S, Dong R. Demonstration of quantum synchronization based on second-order quantum coherence of entangled photons. Scientific reports. Jul. 25, 2016;6:30453. Jul. 25, 2016 (Jul. 25, 2016).
Int'l Search Report and Written Opinion Appln No. PCT/IB2020/000376 mailed Sep. 17, 2020.
Breitfelder et al. eds., IEEE 100: The Authoritative Dictionary of IEEE Standards Terms 1247, definition 2 of "variable" (7th ed. 2000). (Year: 2000).
Int'l Search Report and Written Opinion Appln No. PCT/IB2020/000707 mailed Jan. 12, 2021.
National Academies of Sciences, Engineering, and Medicine. "Quantum Computing: Progress and Prospects". eprint (Dec. 2018) [online]. [retrieved on Jan. 7, 2020]. retrieved from: <https://doi.org/10.17226/25196.> Dec. 4, 2018 (Dec. 4, 2018) pp. 114, 142, 210, Fig. 2.5, Qiskit Backend Specifications at footnote 57: section 4.2, 5.1.5, Fig. 3, Fig. 4 , pp. 30, 57.
IBM Research. "Qiskit Backend Specifications for OpenQASM and OpenPulse Experiments". eprint arXiv:1809.03452v1 (Sep. 10, 2018) [online]. [retrieved on Jan. 7, 2020]. retrieved from: <https://arxiv.org/pdf/1809.03452.pdf> Sep. 10, 2018 (Sep. 10, 2018) section 4.2, 5.1.5, Fig. 3, Fig. 4 , pp. 30, 57.
Int'l Search Report and Written Opinion Appln No. PCT/IB2020/000704 mailed Jan. 17, 2021.

(56) References Cited

OTHER PUBLICATIONS

Wolfowicz, et al. Pulse Techniques for Quantum Information Processing University of Chicago, University College London, eMagRes, 2016, vol. 5: 1515-1528. DOI 10.1002/9780470034590.emrstm1521.

Int'l Search Report and Written Opinion Appln No. PCT/IB2020/000555 mailed Dec. 27, 2020.

Int'l Search Report and Written Opinion Appln No. PCT/IB2020/000760 mailed Jan. 27, 2021.

"Quantum-classical interface based on single flux quantum digital logic". In: Quantum Science and Technology 3.2 (2018), pp. 1-16. DOI: 10.1088/2058-9565/aaa3a0.(retrieved on Jan. 20, 2021). Retrieved from the Internet: <https://arxiv.org/pdf/1710.04645.pdf> McDermott R. et al. Oct. 12, 2017 (Oct. 12, 2017) Section VI, VII, VIII.

Roffe, J., Quantum Error Correction: An Introductory Guide, Dept. of Physics & Astronomy, Univ. of Sheffeld, UK, Oct. 10, 2019, pp. 1-29.

Int'l Search Report and Written Opinion Appln No. PCT/IB2020/001004 mailed May 13, 2021.

Int'l Preliminary Report on Patentability Appln No. PCT/IB2019/001410 mailed Jun. 10, 2021.

Int'l Search Report and Written Opinion Appln No. PCT/IB2021/000067 mailed Jun. 21, 2021.

Japanese Office Action Appln No. 2024-503888 dated Mar. 7, 2025.

\* cited by examiner

SYSTEM AND METHOD FOR CLOCK SYNCHRONIZATION AND TIME TRANSFER BETWEEN QUANTUM ORCHESTRATION PLATFORM ELEMENTS

BACKGROUND

Limitations and disadvantages of conventional quantum control will become apparent to one of skill in the art, through comparison of such approaches with some aspects of the present method and system set forth in the remainder of this disclosure with reference to the drawings.

BRIEF SUMMARY

Methods and systems are provided for clock synchronization and time transfer between quantum orchestration platform elements, substantially as illustrated by and/or described in connection with at least one of the figures, as set forth more completely in the claims.

DETAILED DESCRIPTION

Figure 1:
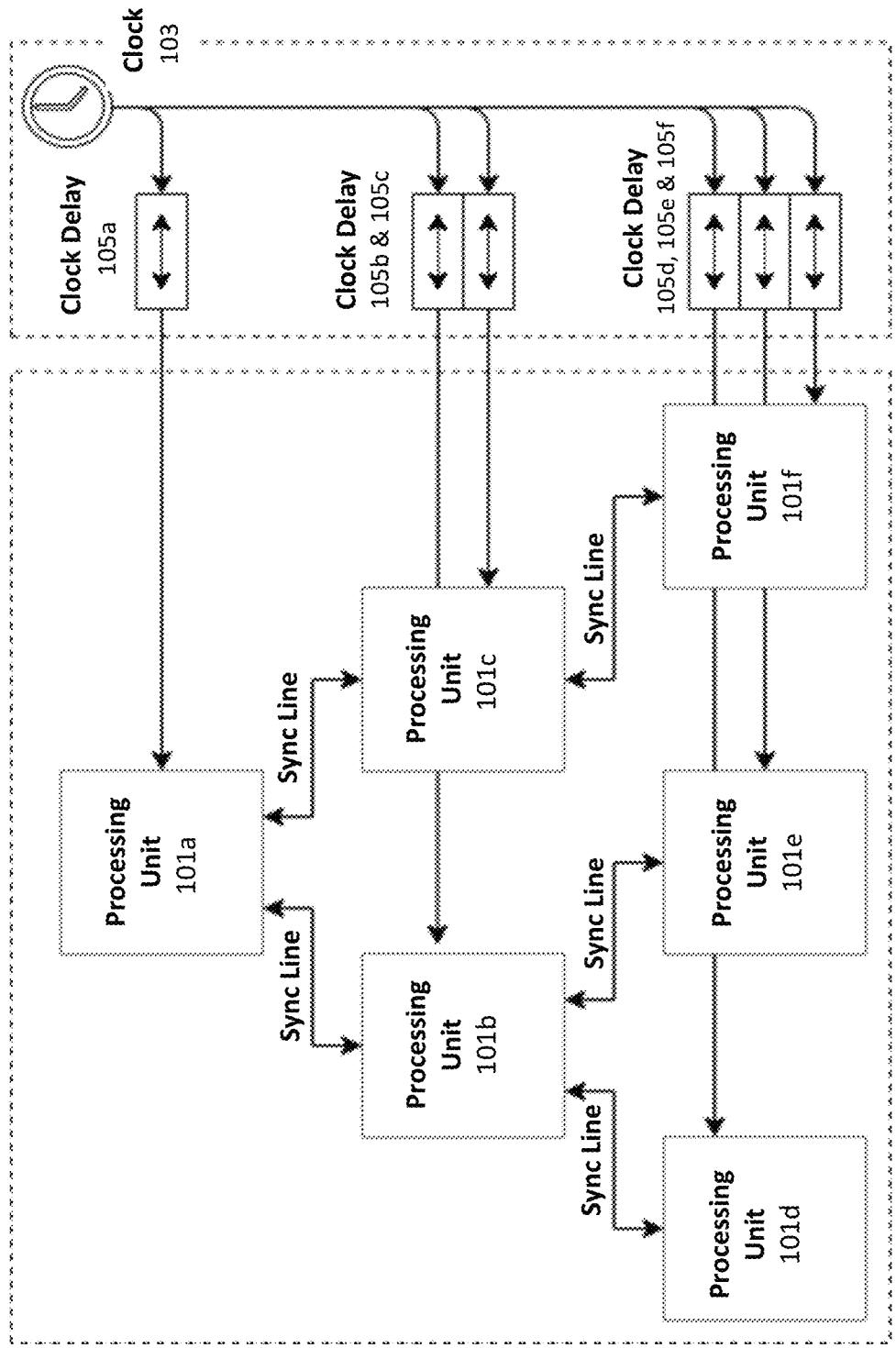
FIG. 1 illustrates a system for distributing clocking information in accordance with various example implementations of this disclosure.

Classical computers operate by storing information in the form of binary digits ("bits") and processing those bits via binary logic gates. At any given time, each bit takes on only one of two discrete values: 0 (or "off") and 1 (or "on"). The logical operations performed by the binary logic gates are defined by Boolean algebra and circuit behavior is governed by classical physics. In a modern classical system, the circuits for storing the bits and realizing the logical operations are usually made from electrical wires that can carry two different voltages, representing the 0 and 1 of the bit, and transistor-based logic gates that perform the Boolean logic operations.

Logical operations in classical computers are performed on fixed states. For example, at time 0 a bit is in a first state, at time 1 a logic operation is applied to the bit, and at time 2 the bit is in a second state as determined by the state at time 0 and the logic operation. The state of a bit is typically stored as a voltage (e.g., 1 $V_{dc}$ for a "1" or 0 $V_{dc}$ for a "0"). The logic operation typically comprises of one or more transistors.

Obviously, a classical computer with a single bit and single logic gate is of limited use, which is why modern classical computers with even modest computation power contain billions of bits and transistors. That is to say, classical computers that can solve increasingly complex problems inevitably require increasingly large numbers of bits and transistors and/or increasingly long amounts of time for carrying out the algorithms. There are, however, some problems which would require an infeasibly large number of transistors and/or infeasibly long amount of time to arrive at a solution. Such problems are referred to as intractable.

Quantum computers operate by storing information in the form of quantum bits ("qubits") and processing those qubits via quantum gates. Unlike a bit which can only be in one state (either 0 or 1) at any given time, a qubit can be in a superposition of the two states at the same time. More precisely, a quantum bit is a system whose state lives in a two dimensional Hilbert space and is therefore described as a linear combination $\alpha|0\rangle + \beta|1\rangle$, where $|0\rangle$ and $|1\rangle$ are two basis states, and $\alpha$ and $\beta$ are complex numbers, usually called probability amplitudes, which satisfy $|\alpha|^2+|\beta|^2=1$. Using this notation, when the qubit is measured, it will be 0 with probability $|\alpha|^2$ and will be 1 with probability $|\beta|^2$. The basis states $|0\rangle$ and $|1\rangle$ can also be represented by two-dimensional basis vectors $$\begin{bmatrix}1\\0\end{bmatrix} \text{ and } \begin{bmatrix}0\\1\end{bmatrix},$$

respectively. In this notation, the qubit state may be represented by $$\begin{bmatrix}\alpha\\\beta\end{bmatrix}.$$

The operations performed by the quantum gates are defined by linear algebra over Hilbert space and circuit behavior is governed by quantum physics. This extra richness in the mathematical behavior of qubits and the operations on them, enables quantum computers to solve some problems much faster than classical computers. In fact, some problems that are intractable for classical computers may become trivial for quantum computers.

Unlike a classical bit, a qubit cannot be stored as a single voltage value on a wire. Instead, a qubit is physically realized using a two-level quantum mechanical system. For example, at time 0 a qubit is described as $$\begin{bmatrix}\alpha_1\\\beta_1\end{bmatrix},$$

at time 1 a logic operation is applied to the qubit, and at time 2 the qubit is described as $$\begin{bmatrix}\alpha_2\\\beta_2\end{bmatrix}.$$

Many physical implementations of qubits have been proposed and developed over the years. Some examples of qubits implementations include superconducting circuits, spin qubits, and trapped ions.

A quantum orchestration platform (QOP) comprises a collection of processing units and analog components that produce synchronized analog pulses, readouts, and computations that may be used for operations with qubits. To pulse simultaneously, all elements of the QOP must have their internal clocks synchronized with minimal skew. In addition, a reliable message distribution system is needed to command all units to start playing pulses simultaneously at some point in time. However, the QOP is modular and comprises individual units, where the length of cables connecting the different units may be arbitrary. This makes the task of distributing a common clock between all units challenging, as the latency of different cables is unknown and subject to environmental changes.

A system for clock synchronization comprises a first processing unit operable at a first clock, a second processing unit operable at a second clock, and a sync line operably coupled between the first processing unit and the second processing unit. The first clock may be provided by a system clock via a first variable delay. The second clock may be provided by the system clock via a second variable delay. The first processing unit is operable to send the first clock to the second processing unit via the sync line. The second processing unit is operable to send the second clock to the first processing unit via the sync line. The second processing unit is operable to generate a first phase difference between the first clock as received and the second clock. The first processing unit is operable to generate a second phase difference between the second clock as received and the first clock. The first variable delay is adjustable according to the first phase difference and the second phase difference. The second variable delay is adjustable according to the first phase difference and the second phase difference.

The first processing unit comprises a first sampling circuit that is operable according to a sample clock. The second processing unit comprises a second sampling circuit that is operable according to the sample clock. The sample clock is at different frequency than the system clock. A sample clock frequency may be, for example, 0.1% greater than a system clock frequency.

The first processing unit and the second processing unit each comprise an XOR gate operable to perform an exclusive OR operation between a sampled first clock and a sampled second clock. The first processing unit and the second processing unit each comprise an averaging circuit operably coupled to an XOR output. The first processing unit and the second processing unit are each operable to determine a duty cycle of a sampled first clock and a duty cycle of a sampled second clock.

The system for clock synchronization may also be used for time transfer, where the first processing unit comprises a first time counter that increments according to a first clock, and the second processing unit comprises a second time counter that increments according to a second clock.

The first processing unit is operable to send a first message to the second processing unit via the sync line cable. The first message comprises a first timestamp according to the first time counter. The second processing unit is also operable to send a second message to the first processing unit via the sync line cable. The second message comprises a second timestamp according to the second time counter. The second processing unit is operable to generate a first timestamp difference according to the first message as received and the second time counter upon arrival of the first message. The first processing unit is also operable to generate a second timestamp difference according to the second message as received and the first time counter upon arrival of the second message.

The first clock is adjustable according to the first timestamp difference and the second timestamp difference. The second clock is also adjustable according to the first timestamp difference and the second timestamp difference.

FIG. 1 illustrates a system for distributing clocking information in accordance with various example implementations of this disclosure. The operation of this system is independent of the length of cables used. The system of FIG. 1 comprises six processing units 101a-101f and a common clock 103. Note, the scope his disclosure is not limited to six processing units.

In the system of FIG. 1, the clock phase information is distributed through a hierarchy of units 101a-101f, where each unit (e.g., 101b) has at most one master (e.g., 101a) and one or more slaves (e.g., 101d and 101e). At each stage, a slave unit (e.g., 101b) will sync its clock phase to its master unit (e.g., 101a), from the upper-most of the hierarchy up to the bottom. Then, messages will be passed between the units 101a-101f to sync their respective timestamp.

Synchronization and communication between any two of the units 101a-101f are established through a single Sync Line cable between them and a shift-capable clock input. The common clock 103 is supplied to each of the units 101a-101f via each of a plurality of clock delays 105a-101f respectively.

To synchronize two units, for example, unit A 101a forwards its system clock to unit B 101b through the common Sync Line cable, while unit B 101b measures the phase difference between the Sync Line cable signal and its system clock supplied via clock delay 105b. Next, unit B 101b forwards its clock to the common Sync Line cable, while unit A 101a measures the phase difference between the Sync Line cable signal and its system clock supplied via clock delay 105b.

Due to symmetric propagation delay through the common cable, the system clock of unit B can be shifted via clock delay 105b to the point where both units measure the same phase in the two measurements. At this point, the clock phase of the two units 101a and 101b is synced or shifted by exactly a half-cycle of the clock. This common Sync Line cable is also used to synchronize a timestamp of the two units 101a and 101b, by sending a message back and forth and marking the local time of each event on each unit.

For example, suppose that the two units 101a and 101b have a timestamp difference of 100 clock cycles, and the propagation delay of the cable is 2 cycles. The first unit 101a will send a message at local time 0 to arrive at the second unit 101b at local time 102. The second unit 101b will send a message back to the first unit 101a at local time 1000, to arrive at local time 902. From these 4 numbers (0, 102, 1000, 902) the timestamp difference of 100 can be extracted. This message handshake also resolves the ambiguity of the half-cycle by returning a timestamp difference with a half-cycle resolution.

The phase difference between two different signals is measured by sampling both clocks with a third clock that has a similar but not exact frequency to the two, then operating an XOR between the sampled data, and finally averaging the outcome. Using the same scheme it is possible to determine the duty cycle of each input clock port, which is needed to further improve the estimated phase difference between the inputs.

Figure 2:
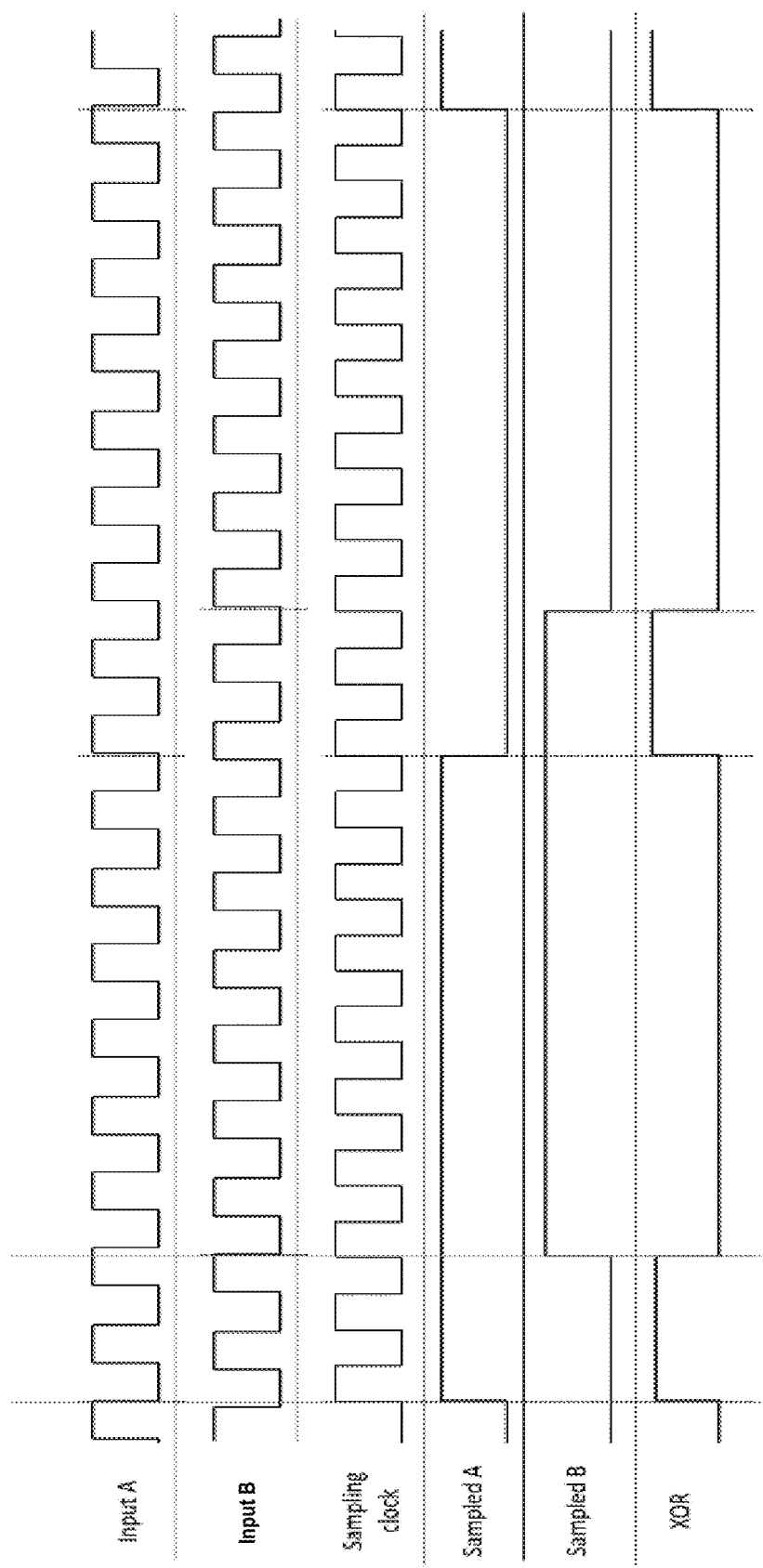
FIG. 2 illustrates sampling waveforms in accordance with various example implementations of this disclosure.

FIG. 2 illustrates sampling waveforms in accordance with various example implementations of this disclosure. For example, to compare two 250 MHz signals (Input A and Input B), these signals are sampled with a 250.25 MHz sampling clock. This sampling measurement is equivalent to sampling the original clock with a resolution of 1000 samples per cycle, which provides sufficient resolution when performing an XOR operation between the two sampled signals. The duty cycle of the XOR result may be estimated by, for example, an exponential moving average. The value from the averaged XOR indicates the absolute value of the phase difference between the two signals (Input A and Input B) probed. When sweeping the phase delay, this information may determine the point at which the two clocks (corresponding to Input A and Input B) are aligned after the associated delay line. By finding the alignment point for the two clock forwarding types (A to B and B to A), it is possible to find the point on which the two local clocks (corresponding to Input A and Input B) are synced, up to a half-cycle ambiguity.

To eliminate electronic sources of noise, the cable connecting the different units may be AC coupled. Messages transmitted between units may be encoded by XOR'ing the data with a clock at half the frequency of the system clock. The encoded message may be captured by setting a capture clock frequency to the system clock, with a phase-shift calibrated to sample the message robustly.

Figure 3:
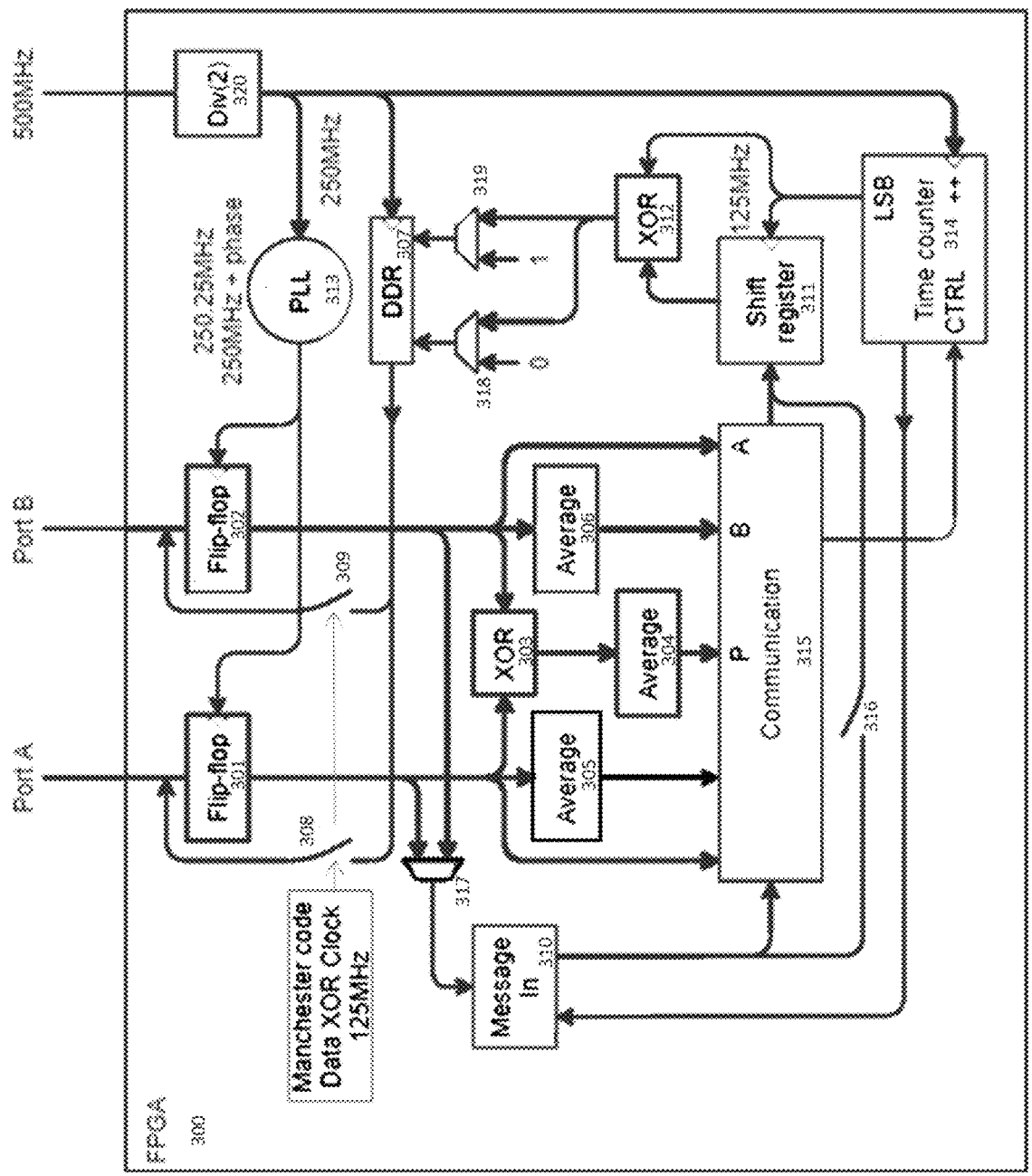
FIG. 3 illustrates system for estimating a phase difference between two signals in accordance with various example implementations of this disclosure.

FIG. 3 illustrates system 300 for estimating a phase difference between two signals (Input A and Input B) in accordance with various example implementations of this disclosure. The system 300 in FIG. 3 may be implemented using discrete logic gates, an ASIC or an FPGA.

The signals may comprise clocks and/or messages. When capturing incoming messages, an onboard PLL 313 provides the sampling clock tuned to match the system clock with a programmable phase. As a phase meter used to synchronize the clocks, the PLL 313 provides a frequency close but not equal to the system clock. The PLL 313 may be fed by a 250 MHz system clock that is generated by a 500 MHz clock Divided by 2 320. At the end of the disclosed process, the 250 MHz clock is synced at a point close to the port IO.

Flip-flops 301 and 302 capture incoming and outgoing signals at Port A and Port B respectively. An incoming message is parsed and timestamped. An outgoing message is timestamped as well. Incoming signals to the two flip-flops 301 and 302 are sampled using the PLL 313 at 250.25 MHz, for example. The signals from the two flip-flops 301 and 302 are XOR'ed 303 and averaged 304. The signals directly from the two flip-flops 301 and 302 are multiplexed 317 and sent 310 to communication block 315. Mux 317 is operable to choose the incoming data lane. The signals directly from the two flip-flops 301 and 302 are also averaged by averaging circuits 305 and 306, respectively, to obtain the duty cycle in communication block 315. The communication block 315 may comprise a processor to orchestrate the operation.

A message output from the communication block 315 enters the shift register 311 and is encoded. Manchester encoding is performed by XOR'ing 312 the shift register 311 output with a clock at 125 MHz, for example. A phase difference between two clocks is determined according to the Manchester encoding.

Mux 318 and mux 319 are operable to select between an output of a 250 MHz clock or the Manchester encoded message at 125 MHz.

Port A and Port B operate in tri-state via switches 308 and 309, respectively, to set the ports as output ports. Switches 308 and 309 may also allow a repeater mode, where an incoming message from one port will leave from the other.

An output path from memory 307 comprising a Manchester-encoded message may be clocked at 125 MHz, for example.

PLL 313 may be set to 250 MHz+phase offset to capture messages, and detect clock shift and divider 320 slip (by measuring incoming clock, which remains unchanged at 250 MHz). The LSB of a Timestamp counter 314 may be used as the 125 MHz clock for messages. The timestamp counter 314 may be controlled to allow a user-defined shift post calibration.

Figure 4:
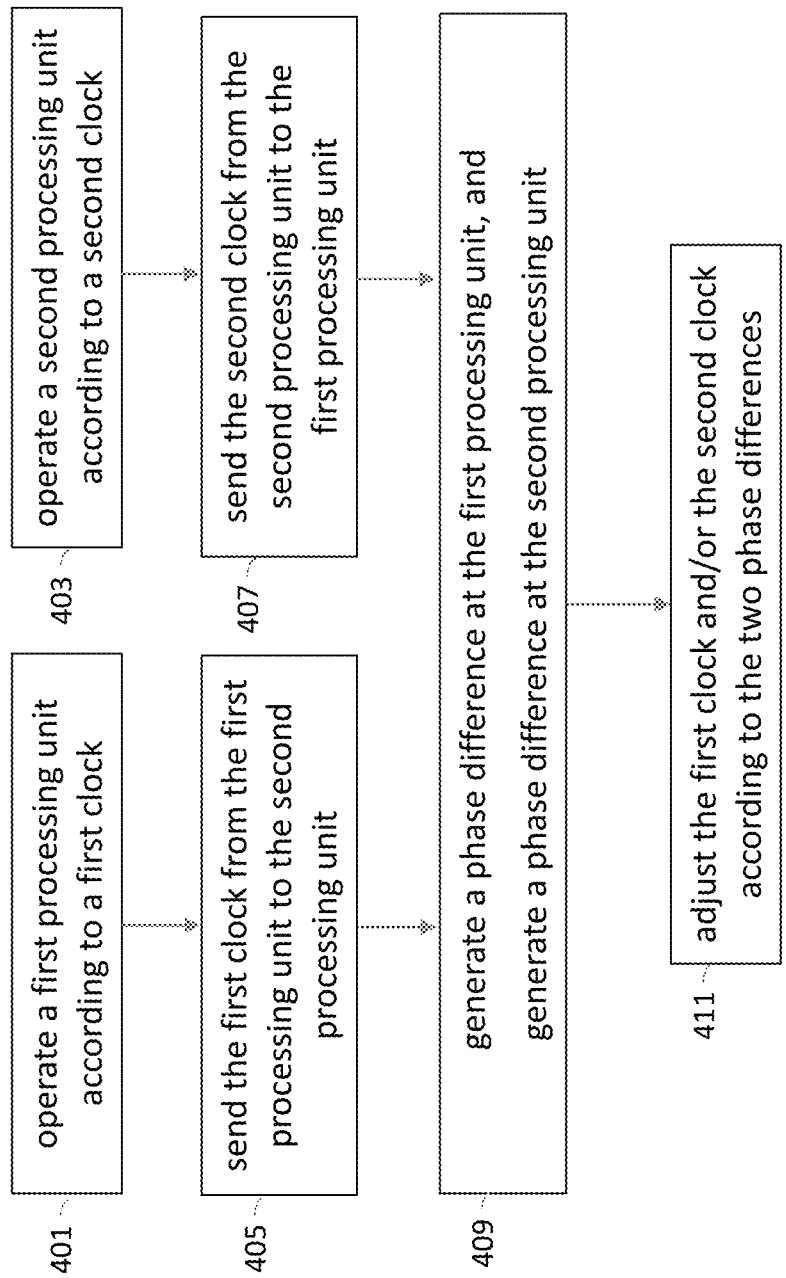
FIG. 4 illustrates a flowchart of an example method for clock synchronization in accordance with various example implementations of this disclosure.

FIG. 4 illustrates a flowchart of an example method for clock synchronization in accordance with various example implementations of this disclosure. The example method for clock synchronization may be used in a QOP comprises a plurality of processing units. For illustration purposes, the plurality of processing units comprise a first processing unit and a second processing unit. The plurality of processing units may comprise additional processing units arranged in a hierarchy as described with respect to FIG. 1.

At 401, a first processing unit operates according to a first clock. Simultaneously at 403, a second processing unit operates according to a second clock. The first clock and the second clock are at a common frequency.

At 405, the first clock is sent from the first processing unit to the second processing unit via a common sync cable. At 407, the second clock is sent from the second processing unit to the first processing unit via the same common sync cable.

At 409, a first phase difference, between the first clock and the second clock is generated at the second processing unit, and a second phase difference, between the first clock and the second clock is generated at the first processing unit. A phase difference generation comprises sampling the first clock and the second clock with a third clock, where the third clock is at a different frequency than the first clock and the second clock. For example, the third clock frequency may be 0.1% greater than the common frequency of the first clock and the second clock. The sampled first clock and the sampled second clock are XOR'ed and averaged to produce a phase difference signal. The duty cycles of the sampled first clock and the sampled second clock are also determined by averaging the sampled first clock and the sampled second clock prior to the XOR.

At 411, one or both of the first clock and the second clock are adjusted according to the first phase difference and the second phase difference. The adjustment may be an advancement (i.e., removal of delay) or an additional delay set via one or more variable delay units.

After the two processing units (101 in FIG. 1) have aligned their phases and shared a timestamp, a link is established for the communication of various messages and operations. Operations may comprise, for example, a command to start, stop, pause or resume execution according to a particular timestamp. Operations may also comprise a recalibration of phase to account for drift. The polarity of the sync line may be alternated to indicate whether a processing unit 101 is transmitting or receiving.

Figure 5:
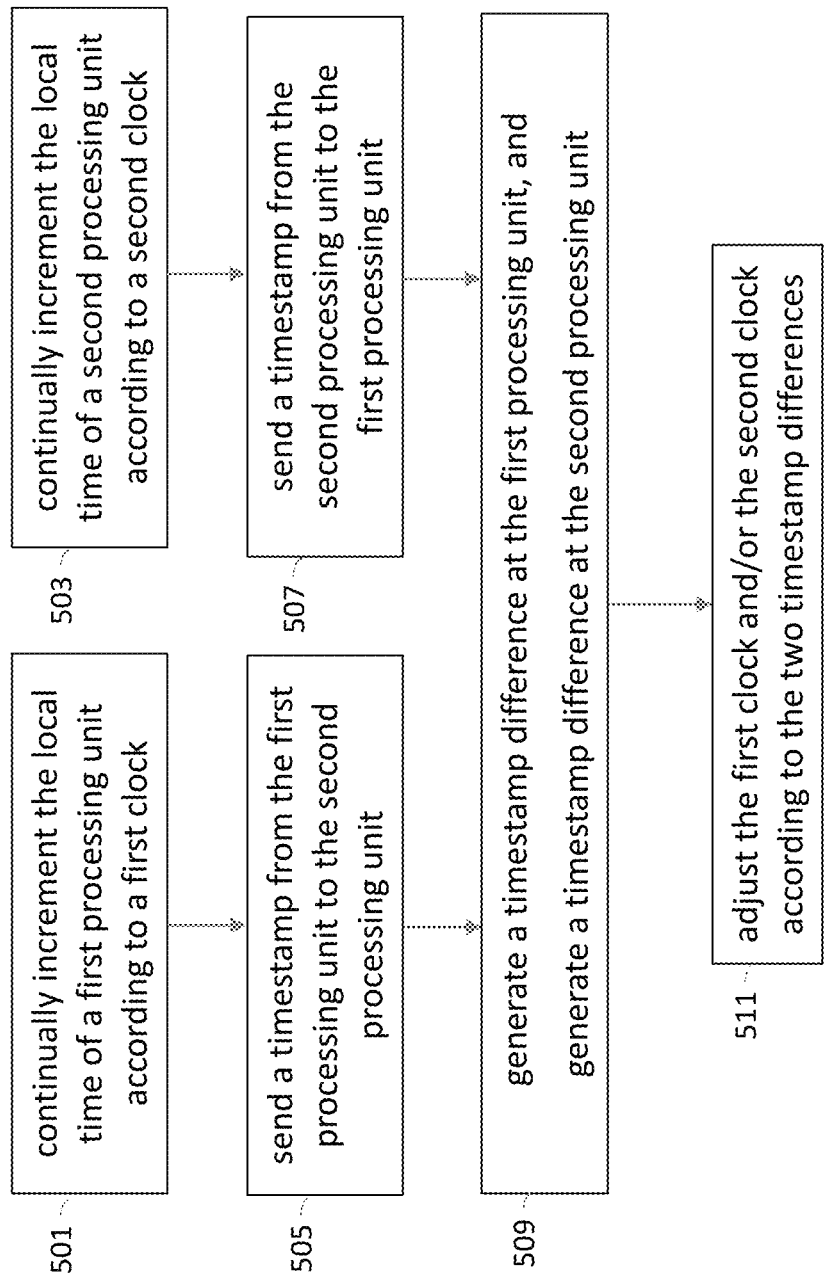
FIG. 5 illustrates a flowchart of an example method for time transfer in accordance with various example implementations of this disclosure.

FIG. 5 illustrates a flowchart of an example method for time transfer in accordance with various example implementations of this disclosure. The example method for time transfer may be used in a QOP comprises a plurality of processing units. For illustration purposes, the plurality of processing units comprise a first processing unit and a second processing unit. The plurality of processing units may comprise additional processing units arranged in a hierarchy as described with respect to FIG. 1.

At 501, a first processing unit continually increments a first local time according to a first clock. Simultaneously at 503, a second processing unit continually increments a second local time according to a second clock. The first clock and the second clock operate at a common frequency.

At 505, a first message with a first timestamp is sent from the first processing unit to the second processing unit via a common sync cable. At 507, a second message with a second timestamp is sent from the second processing unit to the first processing unit via the same common sync cable.

At 509, a first timestamp difference, between the first timestamp and the second local time is generated at the second processing unit, and a second timestamp difference, between the second timestamp and the first local time is generated at the first processing unit. The first timestamp difference may be generated by subtracting the first timestamp from an arrival timestamp that is based on the second local time. The second timestamp difference may be generated by subtracting the second timestamp from an arrival timestamp that is based on the first local time.

At 511, one or both of the first clock and the second clock are adjusted according to the first timestamp difference and the second timestamp difference. The adjustment may be an advancement or an additional delay set via one or more variable delay units.

This disclosed system is operable to synchronize a plurality of devices together with a minimum amount of connectivity. Each device in the plurality of devices may have a small phase error/drift (d_err) with respect to the other device it is coupled to. In some situations, the phase error between consecutive devices (d_err) may be smaller than a minimum phase correction step (d_calibrate).

Even after clock synchronization, a phase error (d_err) may remain between two devices if the step size of a clock generator's phase calibration (d_calibrate) is not small enough. In a system that comprises many devices, this phase error may accumulate and cause a significant phase drift between some of the devices. The accumulated phase error between any two devices, of a plurality of devices, may be monitored and utilized to improve synchronization.

Figure 6:
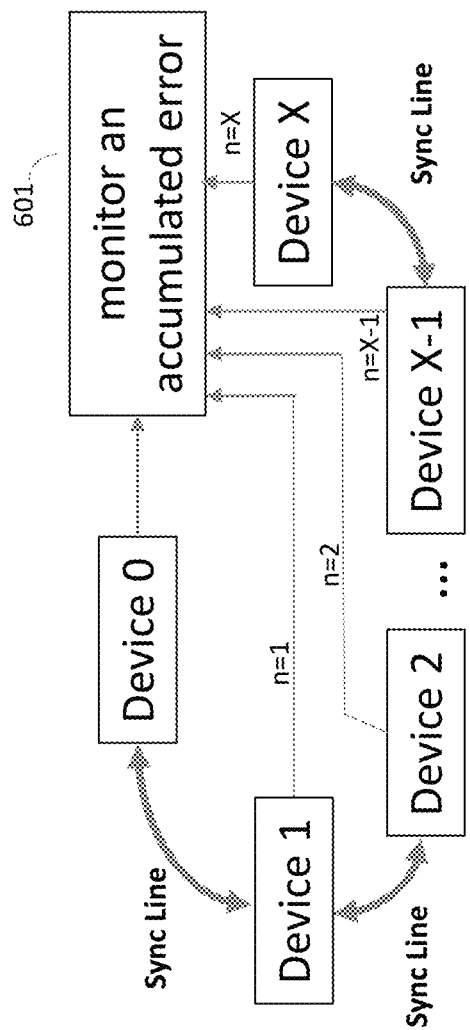
FIG. 6 illustrates a ring topology that is operable to minimize phase error in accordance with various example implementations of this disclosure.

FIG. 6 illustrates a ring topology that is operable to minimize phase error, even when d_err<d_calibrate. The ring topology of FIG. 6 is operable to measure the phase error between two devices. The calibration of every two sequential devices is based on the phase error accumulating in one direction. Therefore, a direct measurement of the phase error between device X and Device 0 will denote the overall accumulated error in a single measurement, allowing a fast and rapid minimization. The error monitor 601 may measures the phase shift between two devices that are directly or indirectly connected.

In a setup of many devices (0 thru X) as illustrated in FIG. 6, the phase of connected devices is monitored directly. The phase error between device 0 and device 2 may be determined by measuring the phase error between device 0 and device 1 and accumulating that phase error with the phase error measured between device 1 and device 2. The monitor 601 may be a physical unit or software.

By using a ring topology, the error between the first device (device 0) and the last device (device X) may be measured directly. Because the error increases between every two devices, the maximal error between device 0 and device X may be measured to determine how many taps/steps of phase correction (d_calibrate) are required. For example, if 3 taps are required to minimize the accumulated phase error, a single tap correction at 0.25, 0.5 and 0.75 of the ring may be made without having to measure all phases.

As illustrated, Device 1 may be connected to Device 0, Device 2 may be connected to Device 1 and so forth up to Device X being connected to Device X-1. An interface 601 between Device X and Device 0 may be used to monitor an accumulated error (X*d_err). According to the accumulated error, the device phases may be adjusted. Alternatively, the phase error between every two devices may be computed. For example, the overall error from Device 0 to Device n is d_err_n. For the first n where d_err_n>d_calibrate, the phase of Device n may be shifted to reduce the overall error by d_calibrate. Every other Device m (n<m<X) may also be shifted to maintain alignment of those devices. A phase error between devices may be corrected in steps. This process of determining when d_err_n>d_calibrate may be repeated until the overall error is minimized.

Figure 7:
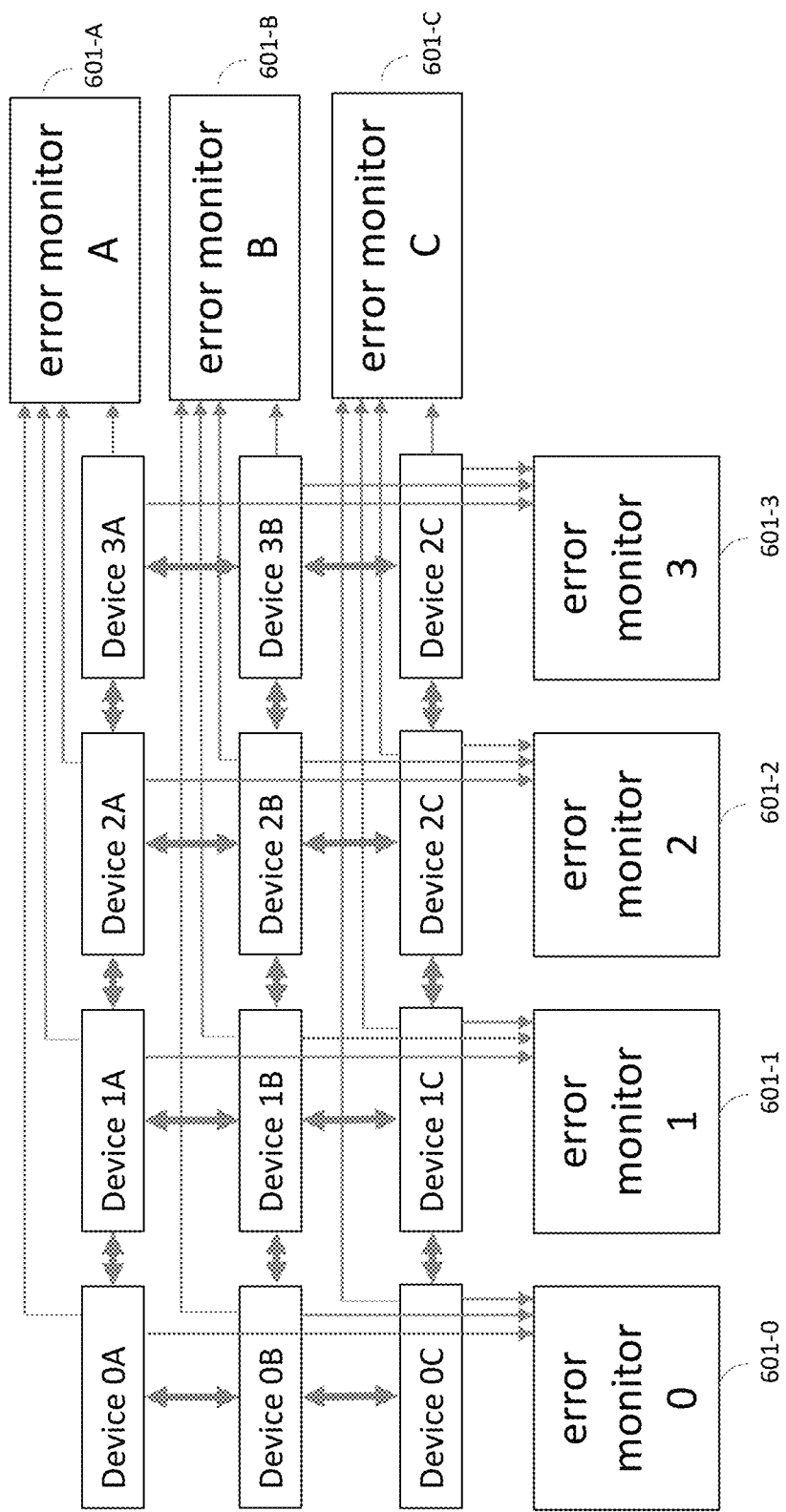
FIG. 7 illustrates a two dimensional ring topology that is operable to minimize phase error among a large number of devices in accordance with various example implementations of this disclosure.

For X*Y devices (Y<X), each group of X devices may establish a ring topology in a first dimension, and each group of Y devices may be connected in a ring topology in a second dimension. FIG. 7 illustrates an example two dimensional ring topology to minimize phase error among a large number of devices. For example, FIG. 7 illustrates a 2-D ring topology with X=4 and Y=3. These dimensions may also be made larger than those illustrated without deviating from the present disclosure. The overall error in every ring (e.g., Rings A, B and C) in a first dimension may be minimized first according to error monitors 601-A, 601-B and 601-C. Then, the overall error in every ring (e.g., Rings 0, 1, 2 and 3) in a second dimension may be minimized according to error monitors 601-0, 601-1, 601-2 and 601-3.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, the term "based on" means "based at least in part on." For example, "x based on y" means that "x" is based at least in part on "y" (and may also be based on z, for example).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system for clock synchronization comprising:
a first processing unit operable at a first clock, wherein the first clock is provided by a system clock via a first variable delay;
a second processing unit operable at a second clock, wherein the second clock is provided by the system clock via a second variable delay; and
a sync line operably coupled between the first processing unit and the second processing unit, wherein:
the first processing unit is operable to send the first clock to the second processing unit via the sync line;
the second processing unit is operable to send the second clock to the first processing unit via the sync line;
the second processing unit is operable to generate a first phase difference between the first clock as received and the second clock;
the first processing unit is operable to generate a second phase difference between the second clock as received and the first clock;
the first variable delay is adjustable according to the first phase difference and the second phase difference; and
the second variable delay is adjustable according to the first phase difference and the second phase difference.

2. The system of claim 1, wherein:
the first processing unit comprises a first sampling circuit that is operable according to a sample clock,
the second processing unit comprises a second sampling circuit that is operable according to the sample clock, and
the sample clock is at different frequency than the system clock.

3. The system of claim 2, wherein a relationship between a sample clock frequency and a system clock frequency is known and configurable.

4. The system of claim 2, wherein:
the first processing unit and the second processing unit each comprise digital logic operable to compute a phase difference between two clocks.

5. The system of claim 2, wherein:
the first processing unit and the second processing unit each comprise an averaging circuit.

6. The system of claim 2, wherein:
the first processing unit and the second processing unit are each operable to determine a duty cycle of a sampled first clock and a duty cycle of a sampled second clock.

7. The system of claim 1, wherein a quantum orchestration platform (QOP) comprises the first processing unit and the second processing unit.

8. A method for clock synchronization comprising:
forwarding, via a cable, a first clock from a first processing unit to a second processing unit;
generating, at the second processing unit, a first phase difference between the first clock as received and a second clock;
forwarding, via the cable, the second clock from the second processing unit to the first processing unit;
generating, at the first processing unit, a second phase difference between the second clock as received and the first clock and;
adjusting, via a variable delay unit, one or both the first clock and the second clock, wherein the adjusting is according to the first phase difference and the second phase difference.

9. The method of claim 8, wherein:
the first clock and the second clock are both at a common frequency,
generating the first phase difference and generating the second phase difference each comprise sampling with a third clock, and
the third clock is at a different frequency.

10. The method of claim 9, wherein a relationship between a sample clock frequency and a system clock frequency is known and configurable.

11. The method of claim 9, wherein generating the first phase difference and generating the second phase difference each comprise performing an exclusive OR operation between a sampled first clock and a sampled second clock.

12. The method of claim 11, wherein generating the first phase difference and generating the second phase difference each comprise averaging an output of the exclusive OR operation.

13. The method of claim 9, wherein generating the first phase difference and generating the second phase difference each comprise determining a duty cycle of a sampled first clock and a duty cycle of a sampled second clock.

14. The method of claim 8, wherein a quantum orchestration platform (QOP) comprises the first processing unit and the second processing unit.

* * * * *